United States Patent [19]
Holz et al.

[11] 4,147,945
[45] Apr. 3, 1979

[54] MOUNTING FOR ROTATING MACHINE ON A DRIVE SHAFT

[75] Inventors: Robert G. Holz, Vert St. Denis; Jean-Robert Lesieux, St. Michel sur Orge; Maurice R. Pigot, Vigneux, all of France

[73] Assignee: Societe Nationale d'Etude et de Construction de Moteurs d'Aviation, Paris, France

[21] Appl. No.: 902,396

[22] Filed: May 3, 1978

[30] Foreign Application Priority Data

May 31, 1977 [FR] France .................. 77 17172

[51] Int. Cl.² ............... H02K 23/60; H02K 7/02
[52] U.S. Cl. ........................ 310/115; 60/904; 310/74
[58] Field of Search ........... 310/66, 67 R, 74, 123, 310/115–121; 74/572, 574; 60/904, 330; 73/229; 290/12, 15, 23, 29, 20, 39, 52

[56] References Cited
U.S. PATENT DOCUMENTS

| 1,861,608 | 6/1932 | Persons | 310/115 X |
| 1,913,371 | 6/1933 | Cleaver | 310/115 X |
| 2,462,182 | 2/1949 | Guerdan et al. | 310/115 |
| 3,079,518 | 2/1963 | Moore | 310/115 |
| 3,862,444 | 1/1975 | Hale | 310/74 |
| 4,084,445 | 4/1978 | Erwin | 310/115 X |

Primary Examiner—Mark O. Budd
Attorney, Agent, or Firm—Bacon & Thomas

[57] ABSTRACT

A rotating machine mounted on a rotating shaft has a rotor turned by the rotating shaft and a stator mounted for free rotation with respect to said shaft. The stator comprises a fly-wheel, ballasted at a point of its periphery and equipped with movable masses to compensate for imbalance in the case of accidental joining in rotation of the rotor and the stator. The disclosure shows an alternator mounted in the forward nose of an aircraft reactor, to supply power to devices located in the rotating parts.

10 Claims, 3 Drawing Figures

MOUNTING FOR ROTATING MACHINE ON A DRIVE SHAFT

BACKGROUND OF THE INVENTION

The present invention concerns a rotating machine of the type comprising a rotor integral with a drive shaft movable with respect to a stator.

In the classic rotating machines of this type the stator is generally integral with a stationary support. In certain cases, however, the requirements of the assembly may result in the absence of any stationary support capable of anchoring the stator. This is the problem encountered specifically in the installation of a rotating machine in the nose of certain advanced aircraft engines. The nose of this type of engine, lacking stationary guide vanes, in effect consists of a fairing integrally rotating with the shaft of the engine. If the intended application renders it desirable to install a rotating machine in the nose, for example, an alternator to supply electric power to devices housed in the rotating parts, it is necessary to provide a resistant couple for the stator part of the machine. On proposal is shown in German Patent 174130 but in that patent the machine is not supported by the drive shaft of the rotor and mounted for free rotation on bearings.

SUMMARY OF THE INVENTION

This problem is solved in the rotating machine of the invention by the fact that the stator is mounted for free rotation with respect to the engine shaft and comprises first means which oppose, in normal operation, a resistant couple on the rotor and second means which automatically annul the perturbation that would be caused to the engine shaft in the case of an accidental joining in rotation of the rotor and the stator.

In the preferred embodiment first means consist of a ballast mass stationary at one point at the periphery of the stator, while second means compensate automatically the unbalance created by said ballast mass in the case of the accidental joining in rotation of the rotor and the stator. It may be understood readily that in the case of the accidental seizing, for example, of the bearings facilitating the relative rotation of the rotor and the stator, or of an increase in friction, the ballast mass rotating in unison with the rotor would create in the absence of a compensating device a dangerous imbalance of the engine.

In keeping with another important characteristic of the present invention, said second means comprises a rolling track arranged within the stator excentrically with respect to the shaft, offset in a direction diametrically opposed to the center of gravity of the ballast mass, while inside of said race at least one balancing mass is capable of displacement.

Advantageously, the bearing race is interrupted on the diameter by the ballast mass and the balancing masses consist of two balls retained, in normal operation, on either side of said ballast mass.

It will be seen that in contrast to the already known devices for the automatic correction of imbalance for rotating pieces, the automatic compensating device of the present invention provides an important additional advantage, specifically for the mounting of a rotating machine on the drive shaft. In normal operation, the balancing masses participate in the resistant couple opposed to the rotor by the stator.

In the preferred application cited above, the rotor of the rotating machine of the invention constitutes the armature of an alternator, the inductor of which is integral with the stator, the rotor being housed integrally in the rotating fairing of the propulsion reactor, said alternator supplying electric power to a receiver such as a signal transmission system. Such a signal transmission system may consist of an emitter of remote measurements making the detection and diagnosis at a distance of breakdowns of the reactor or, inversely, a receiver for the remote control of certain elements susceptible of regulation and located inside the rotor of the reactor. But it should be understood that the rotating machine according to the invention may also be applied to the procedure of any other form of energy; pneumatic, hydraulic, etc. regardless of its use.

BRIEF DESCRIPTION OF THE DRAWINGS

The invention will be better understood if, upon reading the following description, reference is made to the drawings attached, with respect to a preferred embodiment of the invention, given as a nonrestrictive example, in which.

DESCRIPTION OF THE PREFERRED EMBODIMENT

Figure 1:
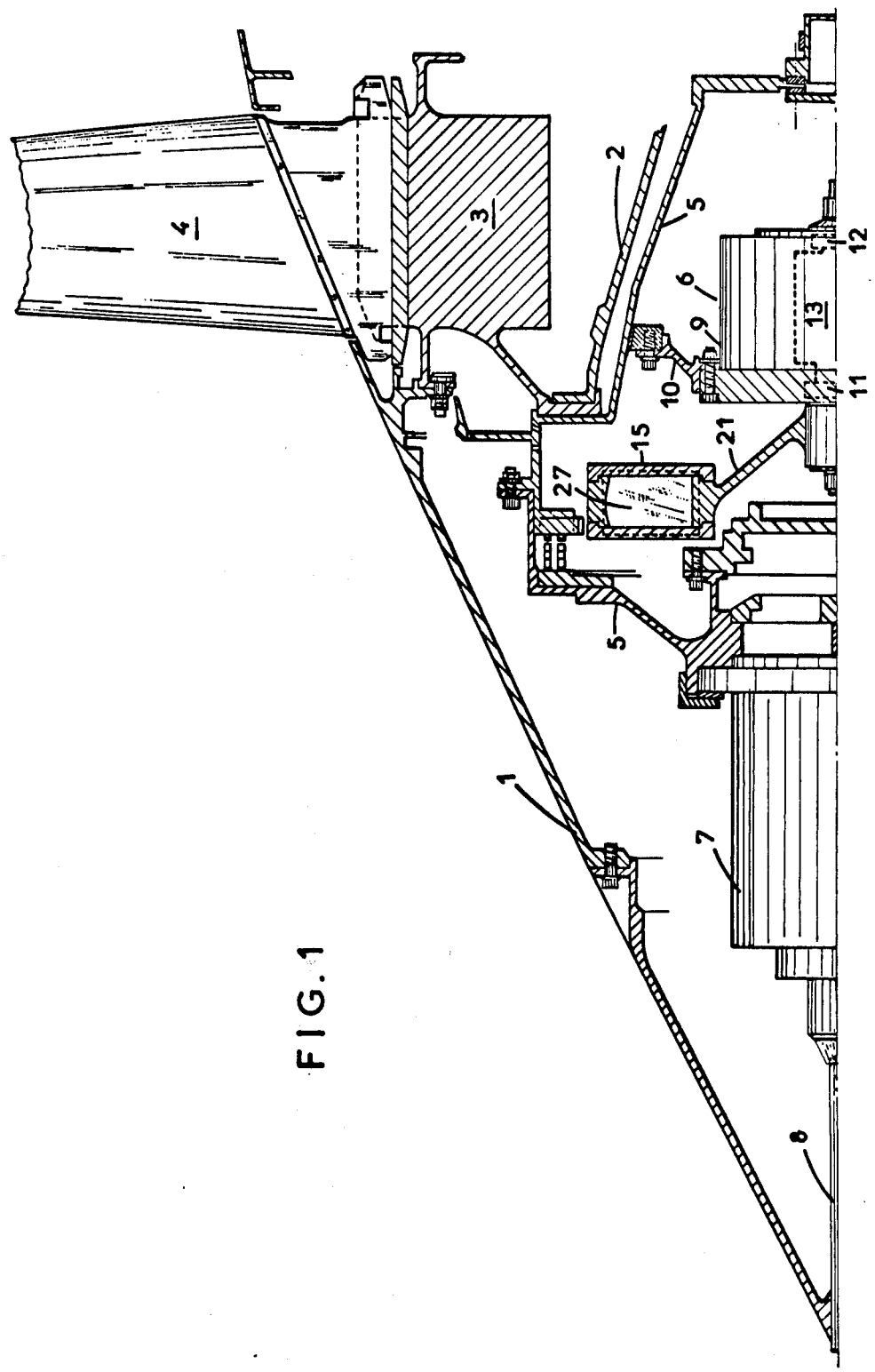
FIG. 1 is an overall view, in a longitudinal semisection, of the nose of a propulsion reactor, with a rotating machine according to the invention mounted on the shaft of said reactor.

The view in longitudinal section of FIG. 1 shows the nose of an aircraft reactor of the dual flow, upstream blower type. The nose comprises a fairing 1, which is fixed to and rotates with the shaft of the engine. At 2, at the right side of the figure the hollow end of the shaft may be seen. The fairing 1 forms the closure of a rotating structure integral with the shaft 2 and the disk 3 which supports the blades of the blower, such as 4. This rotating structure 5 supports and rotates, respectively, in the rear of the alternator 6 and in front, a Herz emitter 7, with its aerial extension 8.

The alternator 6 comprises an armature frame 9, which is fixed to and rotates with the structure 5 by means of a peripheral collar 10, and an inductor 13 mounted freely in rotation, on the ball bearings 11 and 12, inside the armature 9 and coaxially with it.

Figure 2:
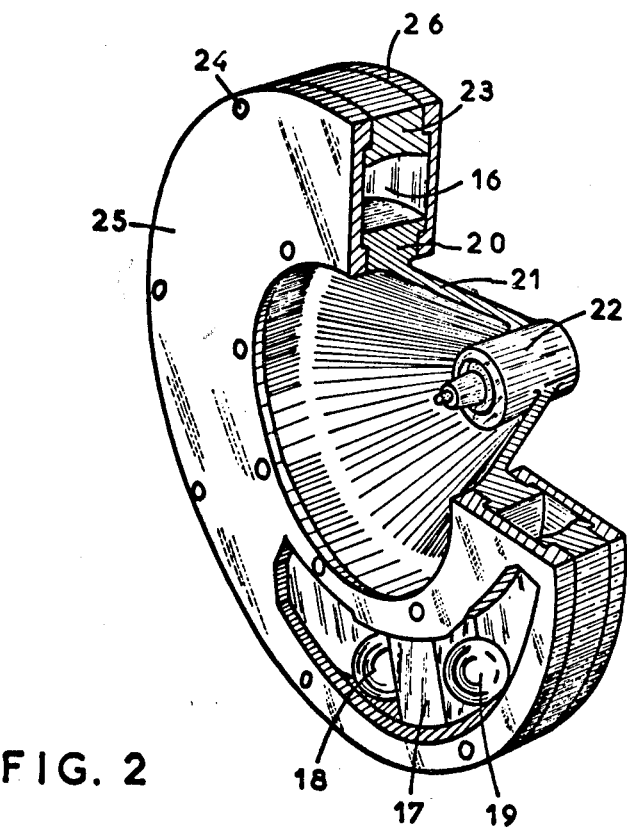
FIG. 2 is a view, in detached perspective, of the front parts of the stator of the rotating machine.

The inductor 13 comprises, upstream and outside the armature, an extension consisting of a disk or fly-wheel 15, said disk being shown in more detail in the perspective view of FIG. 2.

It may be seen in FIG. 2 that the disk 15 comprises an interior circular rolling track 16 interrupted by a ballast mass 17 on its diameter. On either side of said ballast mass and bearing against it are balls 18 and 19 which are capable—as shall be explained later—of circulation in the rolling track 16. In the design shown, the disk 15 consists, for example, of an external annulus 23 and an internal annulus 20 connected by a web 21 with the shaft 22 of the inductor 13. The annuli 20 and 23 are fixed to each other by means of a side plate 25 in front and a side plate 26 in the rear, the assembly being supported by the bolts 24.

Figure 3:
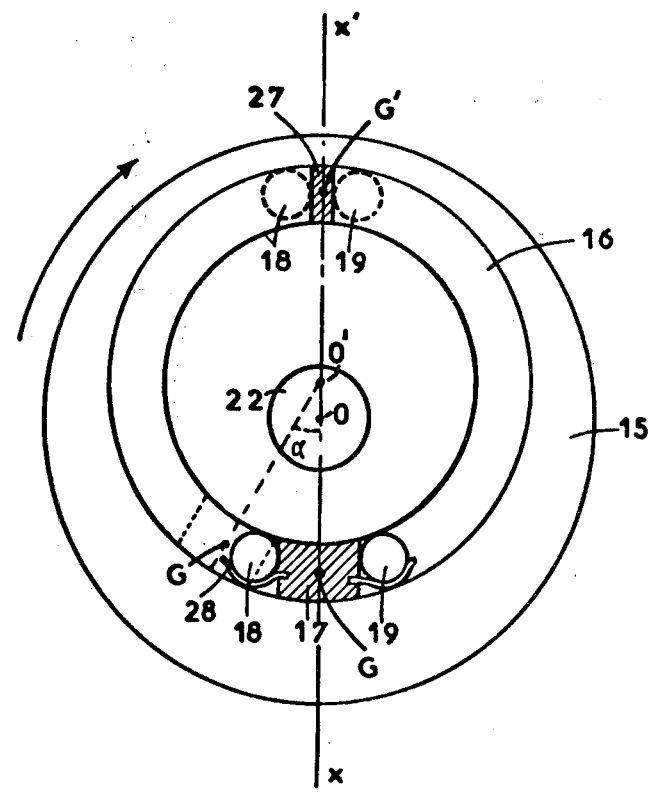
FIG. 3 is a diagrammatic view in transverse section of the stator, illustrating the means for the automatic compensation of imbalance according to the invention.

The schematic transverse sectional view of FIG. 3 shows the path of the circular rolling track 16 inside the disk 15. According to a fundamental characteristic of the device to compensate for an imbalance associated with the rotating machine of the invention, the circular path 16 is eccentric with respect to the axis of the inductor, on a diameter XX' passing through the center of gravity of the mass 17 and offset in a direction opposed to it, as indicated by the respective positions of the points 0 and 0' showing the traces of the axes of the disk 15 and the bearing race 16. The eccentricity may be relatively slight. Good results have been obtained with an eccentricity of 1.5 mm for a disk 15 of a diameter of 240 mm.

At 27, and in accordance with one embodiment, a partition interrupting the rolling track 16 on a diameter in the XX' direction opposing the ballast mass 17, against which the balls 18 and 19 will be urged in the position of automatic imbalance compensation is shown by the dotted line. According to another embodiment illustrated in the example of FIG. 3, elastic plates such as 28, fastened by one of their ends to the ballast mass 17, maintain the balls 18 and 19 applied against the balance mass. During normal operation, these means keep the balls from vibrating and prevent potential contract corrosion to which they may be subjected.

The functioning of the stator part 15, respectively, in the configuration of rest, normal operation and automatic imbalance compensation, may now be better understood by referring to FIG. 3.

At rest, the mass 17 occupies the position represented by solid lines in the figure, aligned with respect to the vertical line XX'.

In normal operation, the engine shaft rotating at its nominal velocity, the composition of the electromagnetic forces and the force of gravity applied at the center of gravity G, force the mass 17 to occupy an equilibrium position represented by a dotted line, offset angularly by an angle α, for the alternator under consideration, with respect to the lower position shown in FIG. 3. It is seen that in this position of normal operation, the balls 18 and 19, which remain urged against the ballast mass 17, also participate in the resistant couple opposed to the rotor.

It will be noted that during normal operation, the combined mass of the balls and the ballast mass continue to play an active role in a directional sense, even in the case of where the field of gravity is suppressed for a relatively long period of time, possibly for several seconds. Such an effect serves, in the preferred application chosen as an example concerning installation on an aircraft engine, to prevent the interference of gusts of wind or air pocket with the functioning of remote measurements or remote controls which are supplied with power by the rotating machine. In the case of the accidental seizure of one of the ball bearings 11 and 12, for example, or of a substantial increase in friction, leading to the joining in rotation of the inductor 13 with the armature 9, the disk 15, which is fixed to the armature 9, will be rotated by the engine shaft. In this case, the centrifugal force then acting upon the masses of the balls 18 and 19 combines with the reaction normal to the slope of the rolling track 16, thus forcing the balls to move in a direction toward the partition 37.

The action of the elastic retainers is linked to a threshold of the angular velocity of rotation of the disk 15; the effect of the centrifugal forces is acceptable below said threshold of angular velocity. Complete safety may be obtained, for example, by setting a velocity threshold equal to one-tenth of nominal velocity, said threshold corresponding to centrifugal forces equal to one-hundredth of the centrifugal forces corresponding to the nominal operating velocity of the engine shaft. Above such a velocity threshold, the effect of the centrifugal force acting upon the masses of the balls 18 and 19, added to those acting upon the free ends of the elastic plates 28, has the effect of forcing said free ends against the outer wall of the rolling track and thus to free the balls for movement. The balls then will occupy the top position shown by the dotted line in FIG. 3. It will be noted that the center of gravity G' of the mass constituted by the balls is placed in a position diametrically opposed to G, the mass of the two balls having been calculated to exactly compensate for the centrifugal force applied to the ballast mass 17; this then will reestablish the equilibrium of the rotor of the reactor. The total mass of the two balls is essentially equal to the ballast mass 17. It will be understood that the condition of balance consists of the equality of static moments with respect to the axis 0 applied respectively at the points G and G'. The assembly illustrated in FIG. 1 is particularly adapted to systems for the transmission of data used in the control of vibrations, stresses, deformation, etc. encountered not only, as shown in the example given, in turboreactors, but also in industrial turbines. Signals generated by transducers mounted on rotating parts, may thus be transmitted at a distance, either to the ground or to experimental test stands, to be analyzed in real time. It will be noted that in this class of application, the absence of telemetric signals constitutes in itself, as verified experimentally, an alarm indicating without ambiguity the stopping of the normal operation of the stator.

We claim:

1. A rotating machine of the type comprising a rotor fixed to a drive shaft for rotation with respect to a stator, characterized by the fact that the stator is carried on a free end of the drive shaft of the rotor, said stator being mounted for free rotation with respect to said shaft and supporting first means and second means, the first means opposing in normal operation a resistant couple on the rotor, and the second means suppressing automatically perturbations caused by said first means on the drive shaft in the event of the accidental rotation of the stator with the rotor.

2. A rotating machine according to claim 1, characterized by the fact that the first means consist of a ballast mass attached to a point on the periphery of the stator, the second means compensating automatically the imbalance created by said mass in the event of the accidental rotation of the stator with the rotor.

3. A rotating machine according to claim 2, characterized by the fact that said second means comprise a circular rolling track arranged within the stator, said bearing race being eccentric with respect to the shaft and displaced in a direction diametrically opposed to the center of gravity of the ballast mass and at least one balancing mass capable of displacement in said track.

4. A rotating machine according to claim 3, characterized by the fact that the rolling track is interrupted on a diameter, in the direction opposed to the ballast mass, by a partition.

5. A rotating machine according to claim 4, characterized by the fact that the rolling track is interrupted on a diameter by the ballast mass, said balancing mass being constituted by two balls, retained during normal operation on either side of said ballast mass.

6. A rotating machine according to claim 5, characterized by the fact that it includes an elastic device to retain the balls against the ballast mass, prestressed so as to allow the displacement of the balls above a certain angular velocity of the stator.

7. A rotating machine according to claim 1, characterized by the fact that the rotor and the drive shaft are joined in rotation by means at the periphery of the rotor.

8. A rotating machine according to claim 1, characterized by the fact that it is located integrally in the rotating fairing of an aircraft propulsion reactor.

9. A rotating machine according to claim 1, characterized by the fact that the rotor constitutes the armature of an alternator, the inductor of which is integral with the stator.

10. A rotating machine according to claim 8 or 9, characterized by the fact that it provides a supply of electricity to a signal transmission system mounted integrally and coaxially with the drive shaft.

* * * * *